United States Patent
Brinkmann et al.

(10) Patent No.: US 10,005,471 B1
(45) Date of Patent: *Jun. 26, 2018

(54) TRAFFIC BASED DRIVING ANALYSIS

(71) Applicant: Allstate Insurance Company, Northbrook, IL (US)

(72) Inventors: Margaret A. Brinkmann, Palo Alto, CA (US); Daniel Kraft, Libertyville, IL (US); Nathan M. Bryer, Arlington Heights, IL (US); Eric Huls, Chicago, IL (US); Thomas Michael Warden, Belmont, CA (US)

(73) Assignee: Allstate Insurance Company, Northbrook, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/375,967

(22) Filed: Dec. 12, 2016

Related U.S. Application Data (63) Continuation of application No. 14/731,745, filed on Jun. 5, 2015, now Pat. No. 9,558,656, which is a (Continued)

(51) Int. Cl.
*G05D 1/00* (2006.01)
*G06F 17/00* (2006.01)
(Continued)

(52) U.S. Cl.
CPC ............ *B60W 40/09* (2013.01); *G07C 5/008* (2013.01); *G08G 1/0112* (2013.01); (Continued)

(58) Field of Classification Search
None
See application file for complete search history.

(56) References Cited

U.S. PATENT DOCUMENTS 5,978,729 A  11/1999  Landes et al.
7,659,827 B2  2/2010  Gunderson et al.
(Continued)

FOREIGN PATENT DOCUMENTS

WO  2001018531 A1  3/2001
WO  2005003885 A2  1/2005
(Continued)

OTHER PUBLICATIONS

Rob Schneider,"Insurance Underwriting and Credit Scores", Consumer Union, Jan. 2003.
(Continued)

*Primary Examiner* — Rami Khatib
(74) *Attorney, Agent, or Firm* — Banner & Witcoff, Ltd.

(57) ABSTRACT

A driving analysis server may be configured to receive vehicle operation data from vehicle sensors and telematics devices of a first vehicle, and may use the data to identify a potentially high-risk or unsafe driving behavior by the first vehicle. The driving analysis server also may retrieve corresponding vehicle operation data from one or more other vehicles, and may compare the potentially high-risk or unsafe driving behavior of the first vehicle to corresponding driving behaviors in the other vehicles. A driver score for the first vehicle may be calculated or adjusted based on the comparison of the driving behavior in the first vehicle to the corresponding driving behaviors in the other vehicles.

20 Claims, 3 Drawing Sheets

Related U.S. Application Data continuation of application No. 13/770,622, filed on Feb. 19, 2013, now Pat. No. 9,081,650.

(60) Provisional application No. 61/739,439, filed on Dec. 19, 2012.

(51) Int. Cl.
| | | |
|---|---|---|
| *G06F 7/00* | (2006.01) | |
| *G05D 3/00* | (2006.01) | |
| *B60W 40/09* | (2012.01) | |
| *G07C 5/00* | (2006.01) | |
| *G08G 1/01* | (2006.01) | |

(52) U.S. Cl.
CPC ..... *B60W 2420/42* (2013.01); *B60W 2510/18* (2013.01); *B60W 2510/20* (2013.01); *B60W 2520/105* (2013.01); *B60W 2540/20* (2013.01); *B60W 2540/30* (2013.01); *B60W 2550/308* (2013.01)

(56) References Cited

U.S. PATENT DOCUMENTS

| | | | |
|---|---|---|---|
| 7,821,421 | B2 | 10/2010 | Tamir et al. |
| 8,085,166 | B2 | 12/2011 | Tamir et al. |
| 8,086,523 | B1 | 12/2011 | Palmer |
| 8,140,359 | B2 | 3/2012 | Daniel |
| 8,510,200 | B2 | 8/2013 | Pearlman et al. |
| 8,653,986 | B2 | 2/2014 | Tamir et al. |
| 9,081,650 | B1 | 7/2015 | Brinkmann et al. |
| 9,104,535 | B1 | 8/2015 | Brinkmann et al. |
| 2002/0111725 | A1 | 8/2002 | Burge |
| 2004/0210353 | A1 | 10/2004 | Rice |
| 2005/0173523 | A1* | 8/2005 | Yushio ............... F01N 11/00 235/384 |
| 2006/0047540 | A1 | 3/2006 | Hutten et al. |
| 2007/0005404 | A1 | 1/2007 | Raz et al. |
| 2007/0027583 | A1* | 2/2007 | Tamir ............... G06Q 30/0283 701/1 |
| 2007/0027726 | A1 | 2/2007 | Warren et al. |
| 2007/0174004 | A1* | 7/2007 | Tenzer ............... G06Q 10/04 701/123 |
| 2007/0203625 | A1* | 8/2007 | Quigley ............... F02D 41/1406 701/103 |
| 2008/0065427 | A1 | 3/2008 | Helitzer et al. |
| 2008/0082372 | A1 | 4/2008 | Burch |
| 2008/0255722 | A1 | 10/2008 | McClellan et al. |
| 2008/0270519 | A1 | 10/2008 | Ekdahl et al. |
| 2009/0024419 | A1 | 1/2009 | McClellan et al. |
| 2009/0079555 | A1 | 3/2009 | Aguirre De Carcer et al. |
| 2009/0284361 | A1 | 11/2009 | Boddie et al. |
| 2010/0030582 | A1 | 2/2010 | Rippel et al. |
| 2010/0030586 | A1 | 2/2010 | Taylor et al. |
| 2010/0157061 | A1 | 6/2010 | Katsman et al. |
| 2010/0205012 | A1 | 8/2010 | McClellan |
| 2010/0238009 | A1 | 9/2010 | Cook et al. |
| 2010/0250021 | A1 | 9/2010 | Cook et al. |
| 2010/0299021 | A1 | 11/2010 | Jalili |
| 2010/0332266 | A1 | 12/2010 | Tamir et al. |
| 2011/0090075 | A1 | 4/2011 | Armitage et al. |
| 2011/0106370 | A1 | 5/2011 | Duddle et al. |
| 2011/0145042 | A1* | 6/2011 | Green ............... B60W 40/09 705/14.1 |
| 2011/0160964 | A1 | 6/2011 | Obradovich |
| 2011/0184784 | A1 | 7/2011 | Rudow et al. |
| 2011/0320492 | A1 | 12/2011 | Inghelbrecht |
| 2012/0066007 | A1 | 3/2012 | Ferrick et al. |
| 2012/0089423 | A1* | 4/2012 | Tamir ............... G06Q 30/0283 705/4 |
| 2013/0338914 | A1 | 12/2013 | Weiss |
| 2014/0257870 | A1 | 9/2014 | Cielocha et al. |
| 2014/0278574 | A1 | 9/2014 | Barber |

FOREIGN PATENT DOCUMENTS

| | | |
|---|---|---|
| WO | 2011057217 A2 | 5/2011 |
| WO | 2011128873 A2 | 10/2011 |

OTHER PUBLICATIONS

Manitoba Public Insurance, "Moving Toward a Better Driver Rating System" dated 2008.
Chris Tijerina, "How Your Auto Insurance Rates Are Determined", Ezine Articles, date unknown captured May 9, 2012.
Neighborhood Link Website, Your Credit Score Affects Your Auto Insurance Rates, date unknown captured May 9, 2012.
Robin Harbage, "Usage-based Auto Insurance (UBI)" © 2010 Towers Watson.
MyDrive Solutions website, "How does MyDrive work?", date unknown, captured May 9, 2012.
Computer Weekly Website, "How pay-as-you-behave technology could transform car insurance", published Apr. 4, 2011.
Non-Final Office Action for related U.S. Appl. No. 13/770,592 dated Oct. 7, 2014.
Farmers Essential Life ® Universal Life Website; "Universal Life Insurance Designed to Be Flexible to Fit Your Needs", www.farmers.com/universal_life_insurance.html; date unknown, captured May 9, 2012.
Golden State Mutual Life Website; "Introducing Universal Life Insurance", www.gsmlife.com/universal life-Conserv.htm; date unknown, captured May 9, 2012.
Jul. 6, 2016—(US) Non-Final Office Action—U.S. Appl. No. 14/792,645.
Jan. 18, 2017—U.S. Notice of Allowance—U.S. Appl. No. 14/792,645.
Sep. 8, 2017—U.S. Non-Final Office Action—U.S. Appl. No. 15/481,680.
Mar. 29, 2018—U.S. Non-Final Office Action—U.S. Appl. No. 15/481,680.

* cited by examiner

TRAFFIC BASED DRIVING ANALYSIS

CROSS REFERENCE TO RELATED APPLICATIONS

The present application is a continuation of and claims priority to co-pending U.S. patent application Ser. No. 14/731,745, filed Jun. 5, 2015, and entitled "Traffic Based Driving Analysis," which is a continuation of and claims priority to U.S. patent application Ser. No. 13/770,622 (now U.S. Pat. No. 9,081,650), filed Feb. 19, 2013 and entitled "Traffic Based Driving Analysis," which is a non-provisional of and claims priority to U.S. Provisional Application Ser. No. 61/739,439, entitled "Traffic Based Driving Analysis," filed Dec. 19, 2012, the contents of these applications are hereby incorporated by reference in their entirety for all purposes.

TECHNICAL FIELD

Aspects of the disclosure generally relate to the analysis of driving data and calculation of driver scores. In particular, various aspects of the disclosure include a framework for evaluating a driving behavior at a vehicle using vehicle sensor data and telematics from a plurality of other vehicles and other data sources.

BACKGROUND

Telematics includes the use of technology to communicate information from one location to another. Telematics has been used for various applications, including for the exchange of information with electronic sensors. As telematics technology has progressed, various communication methodologies have been incorporated into automobiles and other types of vehicles.

Telematics systems such as on-board diagnostics (OBD) systems may be used in automobiles and other vehicles. OBD systems may provide information from the vehicle's on-board computers and sensors, allowing users to monitor a wide variety of information relating to the vehicle systems, such as engine RPM, emissions control, coolant temperature, vehicle speed, timing advance, throttle position, and oxygen sensing, and many other types of data. Telematics devices installed within vehicles may be configured to access the vehicle computers and sensor data, and transmit the data to a display within the vehicle, a personal computer or mobile device, or to a centralized data processing system. Data obtained from OBD systems has been used for a variety of purposes, including maintenance, diagnosis, and analysis.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for analyzing vehicle operation data, or driving data, and calculating or adjusting a driver score based on the analyzed driving data. One or more on-board data recording systems within a vehicle, for example, a telematics device, may be configured to collect vehicle operational data and transmit the data to a vehicle operation computer system or a driving analysis server. Vehicle operational data may include various data collected by the vehicle's internal sensors, computers, and cameras, such as the vehicle's speed, rates of acceleration or braking, instances of swerving, impacts to the vehicle, data indicating driver distractions within the vehicle, and usage of seat belts, turn signals, and other vehicle controls. Based on the vehicle operational data, the driving analysis server may be configured to identify one or more potentially high-risk or unsafe driving behaviors at a first vehicle, for example, speeding, sudden acceleration or braking, swerving, lane departures, tailgating, etc. According to certain aspects, additional data may be retrieved from one or more external data sources in order to identify the potentially high-risk or unsafe driving behaviors. For example, speeding by the first vehicle may be determined using speed sensor data and location data from the first vehicle, along with speed limit data from a separate data source. As another example, occurrences of aggressive driving in bad weather may be identified using operation data from the vehicle, along with weather data from a separate weather database.

In accordance with further aspects of the present disclosure, corresponding vehicle operation data may be retrieved for one or more additional vehicles at a similar time, location, and/or circumstances to the potentially high-risk or unsafe driving behavior of the first vehicle. For example, if the potentially high-risk or unsafe driving behavior of the first vehicle is speeding along an isolated road, then corresponding speed data may be retrieved from other vehicles along the same isolated road to identify one or more other vehicles that also may have been speeding along the same road. The driving analysis server may identify and measure the number of occurrences of the same driving behavior to determine whether or not to adjust a driver score for the first vehicle based on the driving behavior. For instance, if a high percentage of other vehicles have the same driving behavior as the first vehicle, the behavior may be deemed less risky or unsafe and the driver score associated with the first vehicle might not be lowered, whereas if a low percentage of other vehicles have the same driving behavior, the behavior may be deemed more risky or unsafe and the driver score associated with the first vehicle may be lowered.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
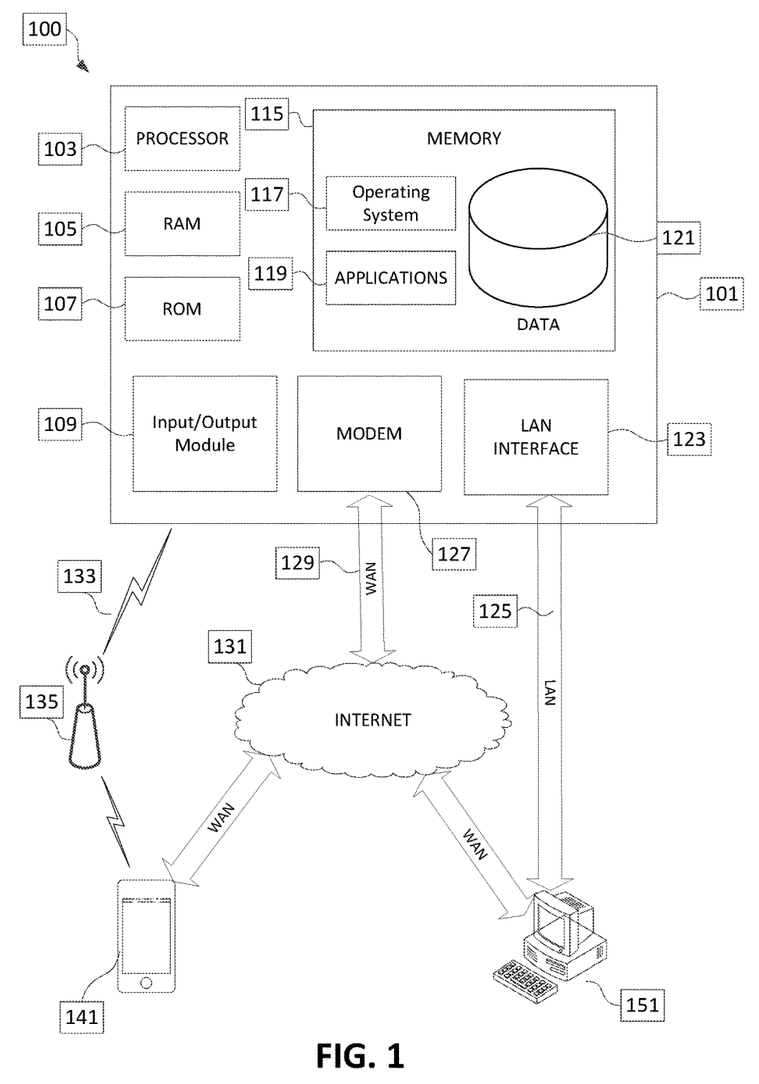
FIG. 1 illustrates a network environment and computing systems that may be used to implement aspects of the disclosure.

FIG. 1 illustrates a block diagram of a computing device (or system) 101 in communication system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as a driving analysis server or system, configured as described herein for receiving and analyzing vehicle driving data and calculating driver scores based on the driving analysis.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the driving analysis system 101 to execute a series of computer-readable instructions to receive a driving data from a first vehicle, retrieve additional driving data for other vehicles corresponding to first vehicle driving data, and perform a driving data analysis for the first vehicle.

The driving analysis system 101 may operate in a networked environment 100 supporting connections to one or more remote computers, such as terminals 141 and 151. The terminals 141 and 151 may be personal computers, servers (e.g., web servers, database servers), or mobile communication devices (e.g., vehicle telematics devices, on-board vehicle computers, mobile phones, portable computing devices, and the like), and may include some or all of the elements described above with respect to the driving analysis system 101. The network connections depicted in FIG. 1 include a local area network (LAN) 125 and a wide area network (WAN) 129, and a wireless telecommunications network 133, but may also include other networks. When used in a LAN networking environment, the driving analysis system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Additionally, one or more application programs 119 used by the driving analysis server/system 101 may include computer executable instructions (e.g., driving analysis programs and driver score algorithms) for receiving vehicle driving data, retrieving additional driving data for other vehicles, analyzing and comparing the driving data with respect to specific driving behaviors, performing a driving data analysis or driver score computation for one or more vehicles or drivers, and performing other related functions as described herein.

As used herein, a driver score (or driving score) may refer to a measurement of driving abilities, safe driving habits, and other driver information. A driver score may be a rating generated by an insurance company, financial instruction, or other organization, based on the driver's age, vision, medical history, driving record, and/or other account data relating to the driver. For example, an insurance company server 101 may periodically calculate driver scores for one or more of the insurance company's customers, and may use the driver scores to perform insurance analyses and determinations (e.g., determine coverage, calculate premiums and deductibles, award safe driver discounts, etc.). As discussed below, the driver score may be increased or decreased based on the real-time data collected by on-board data recording systems (e.g., vehicle sensors, cameras, and telematics devices), and other systems for measuring driving performance. For example, if a driver consistently drives within posted speed limits, wears a seatbelt, and keeps the vehicle in good repair, the driver score may be increased. Alternatively, if a driver regularly speeds, drives aggressively, and does not properly maintain the vehicle, the driver score may be lowered. It should be understood that a driver score, as used herein, may be associated with an individual, group of individuals, or a vehicle. For instance, a family, group of friends or co-workers, or other group that shares a vehicle, may have a single driver score that is shared by the group. Additionally, a vehicle may have an associated driver score that is based on one or more primary drivers of the vehicle and can be affected by the driving behavior of any the vehicle's drivers. In other examples, a vehicle may be configured to identify different drivers, and each driver of the vehicle may have a separate driver score.

Figure 2:
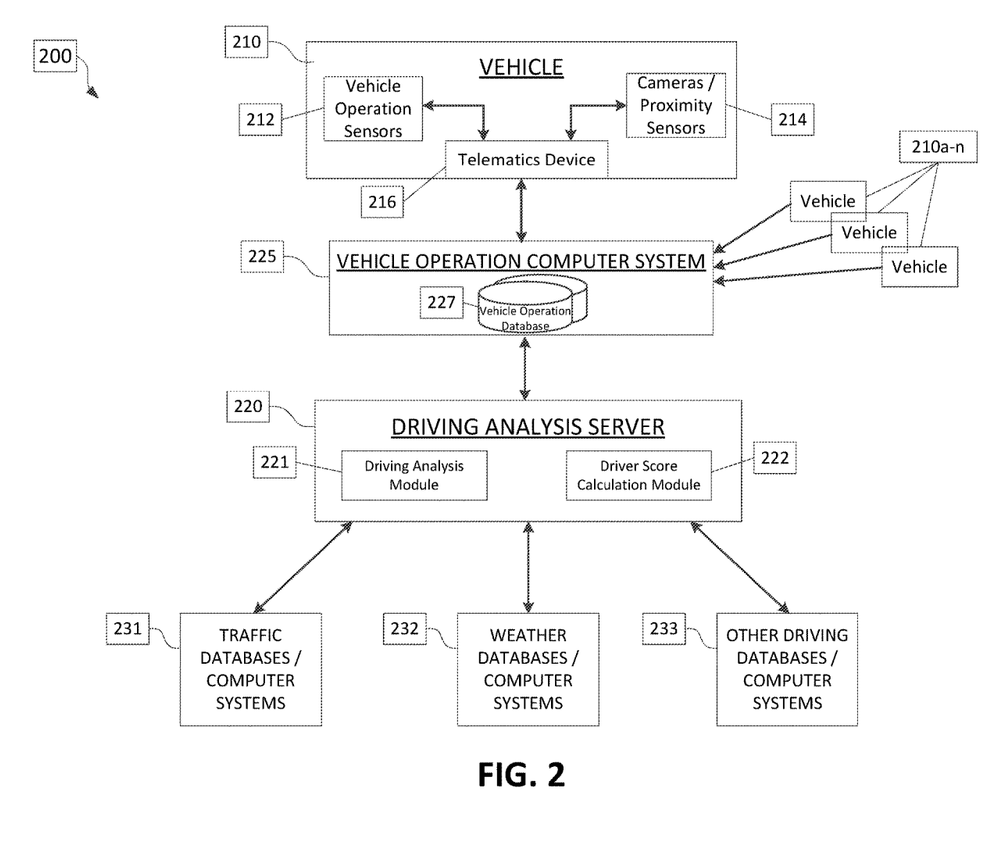
FIG. 2 is a diagram of a driving analysis system, according to one or more aspects of the disclosure.

FIG. 2 is a diagram of an illustrative driving analysis system 200. Each component shown in FIG. 2 may be implemented in hardware, software, or a combination of the two. Additionally, each component of the driving analysis system 200 may include a computing device (or system) having some or all of the structural components described above for computing device 101.

The driving analysis system 200 shown in FIG. 2 includes a vehicle 210, such as an automobile, motorcycle, or other vehicle for which a driving analysis may be performed and for which a driver score may be calculated. The vehicle 210 may include one or more on-board data recording systems, for example, on-board diagnostic (ODB) systems, telematics devices 216, and/or vehicle computer systems, which may include or may be configured to communicate with vehicle sensors 212, proximity sensors and cameras 214, and other on-board data detection devices.

Vehicle operation sensors 212 refer to a set of sensors and data detection devices capable of detecting and recording various conditions at the vehicle and operational parameters of the vehicle. For example, sensors 212 may detect and store data corresponding to the vehicle's speed, distances driven, rates of acceleration or braking, and specific instances of sudden acceleration, braking, and swerving. Sensors 212 also may detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 212 may detect and store the external driving conditions, for example, external temperature, rain, snow, light levels, and sun position for driver visibility. Sensors 212 also may detect and store data relating to moving violations and the observance of traffic signals and signs by the vehicle 210. Additional sensors 212 may detect and store data relating to the maintenance of the vehicle 210, such as the engine status, oil level, engine coolant temperature, odometer reading, the level of fuel in the fuel tank, engine revolutions per minute (RPMs), and/or tire pressure.

The vehicle 210 also may include one or more cameras and proximity sensors 214 capable of recording additional conditions inside or outside of the vehicle 210. Internal cameras 214 may detect conditions such as the number of the passengers in the vehicle 210, and potential sources of driver distraction within the vehicle (e.g., pets, phone usage, unsecured objects in the vehicle). External cameras and proximity sensors 214 may detect other nearby vehicles, traffic levels, road conditions, traffic obstructions, animals, cyclists, pedestrians, and other conditions that may factor into a driving analysis.

The operational sensors 212 and the cameras and proximity sensors 214 may store data within the vehicle 210, and/or may transmit the data to one or more external computer systems (e.g., a vehicle operation computer system 225 and/or a driving analysis server 220). As shown in FIG. 2, the operation sensors 212, and the cameras and proximity sensors 214, may be configured to transmit data to a vehicle operation computer system 225 via a telematics device 216. In other examples, one or more of the operation sensors 212 and/or the cameras and proximity sensors 214 may be configured to transmit data directly without using a telematics device 216. For example, telematics device 216 may be configured to receive and transmit data from operational sensors 212, while one or more cameras and proximity sensors 214 may be configured to directly transmit data to a vehicle operation computer system 225 or a driving analysis server 220 without using the telematics device 216. Thus, telematics device 216 may be optional in certain embodiments where one or more sensors or cameras 212 and 214 within the vehicle 210 may be configured to independently capture, store, and transmit vehicle operation and driving data.

Telematics device 216 may be a computing device containing many or all of the hardware/software components as the computing device 101 depicted in FIG. 1. As discussed above, the telematics device 216 may receive vehicle operation and driving data from vehicle sensors 212, and proximity sensors and cameras 214, and may transmit the data to one or more external computer systems (e.g., a vehicle operation computer system 225 and/or a driving analysis server 220) over a wireless transmission network. Telematics device 216 also may be configured to detect or determine additional types of data relating to real-time driving and the condition of the vehicle 210. In certain embodiments, the telematics device 216 may contain or may be integral with one or more of the vehicle sensors 212 and proximity sensors and cameras 214 discussed above, and/or with one or more additional sensors discussed below.

Additionally, the telematics device 216 may be configured to collect data regarding the number of passengers and the types of passengers (e.g. adults, children, teenagers, pets, etc.) in the vehicle 210. The telematics device 216 also may be configured to collect data a driver's movements or the condition of a driver. For example, the telematics device 216 may include or communicate with sensors that monitor a driver's movements, such as the driver's eye position and/or head position, etc. Additionally, the telematics device 216 may collect data regarding the physical or mental state of the driver, such as fatigue or intoxication. The condition of the driver may be determined through the movements of the driver or through sensors, for example, sensors that detect the content of alcohol in the air or blood alcohol content of the driver, such as a breathalyzer.

The telematics device 216 also may collect information regarding the driver's route choice, whether the driver follows a given route, and to classify the type of trip (e.g. commute, errand, new route, etc.). In certain embodiments, the telematics device 216 may be configured to communicate with the sensors and/or cameras 212 and 214 to determine when and how often the vehicle 210 stays in a single lane or strays into other lanes. To determine the vehicle's route, lane position, and other data, the telematics device 216 may include or may receive data from a mobile telephone, a Global Positioning System (GPS), locational sensors positioned inside a vehicle, or locational sensors or devices remote from the vehicle 210.

The telematics device 216 also may store the type of the vehicle 210, for example, the make, model, trim (or submodel), year, and/or engine specifications. The vehicle type may be programmed into the telematics device 216 by a user or customer, determined by accessing a remote computer system, such as an insurance company or financial institution server, or may be determined from the vehicle itself (e.g., by accessing the vehicle's 210 computer systems).

Vehicle operation computer system 225 may be a computing device separate from the vehicle 210, containing some or all of the hardware/software components as the computing device 101 depicted in FIG. 1. The vehicle operation computer system 225 may be configured to receive and store the vehicle operation data discussed above from vehicle 210, and similar vehicle operation data from one or more other vehicles 210a-n. In the example shown in FIG. 2, the vehicle operation computer system 225 includes a vehicle operation database 227 that may be configured to store the vehicle operation data collected from the vehicle sensors 212, proximity sensors and cameras 214, and telematics devices 216 of a plurality of vehicles. The vehicle operation database 227 may store operational sensor data, proximity sensor data, camera data (e.g., image, audio, and/or video), location data and/or time data for multiple vehicles 210.

Data stored in the vehicle operation database 227 may be organized in any of several different manners. For example, a table in the vehicle operation database 227 may contain all of the vehicle operation data for a specific vehicle 210, similar to a vehicle event log. Other tables in the vehicle operation database 227 may store certain types of data for multiple vehicles. For instance, tables may store specific driving behaviors (e.g., driving speed, acceleration and braking rates, swerving, tailgating, use of turn signals or other vehicle controls, etc.) for multiples vehicles 210 at specific locations, such as specific neighborhoods, roads, or intersections. Vehicle operation data may also be organized by time, so that the driving behaviors of multiples vehicles 210 may be stored or grouped by time (e.g., morning, afternoon, late night, rush hour, weekends, etc.) as well as location.

The system 200 also may include a driving analysis server 220, containing some or all of the hardware/software components as the computing device 101 depicted in FIG. 1. The driving analysis server 220 may include hardware, software, and network components to receive vehicle operation data from the vehicle operation computer system 225 and/or directly from a plurality of vehicles 210. The driving analysis server 220 and the vehicle operation computer system 225 may be implemented as a single server/system, or may be separate servers/systems. In some examples, the driving analysis server 220 may be a central server configured to receive vehicle operation data from a plurality of remotely located vehicle operation computer systems 225.

As shown in FIG. 2, driving analysis server 220 may include a driving analysis module 221 and a driver score calculation module 222. Modules 221 and 222 may be implemented in hardware and/or software configured to perform a set of specific functions within the driving analysis server 220. For example, the driving analysis module 221 and the driver score calculation module 222 may include one or more driving analysis/driver score calculation algorithms, which may be executed by one or more software applications running on generic or specialized hardware within the driving analysis server 220. The driving analysis module 221 may use the vehicle operation data received from the vehicle operation computer system 225 and/or other systems to perform driving analyses for specific vehicles 210. The driver score calculation module 222 may use the results of the driving analysis performed by module 221 to calculate or adjust a driver score for a driver of a vehicle 210 based on specific driving behaviors. Further descriptions and examples of the algorithms, functions, and analyses that may be executed by the driving analysis module 221 and the driver score calculation module 222 are described below in reference to FIG. 3.

To perform driving analyses and driver score calculations, the driving analysis server 220 may initiate communication with and/or retrieve data from one or more vehicles 210, vehicle operation computer systems 225, and additional computer systems 231-233 storing data that may be relevant to the driving analyses and driver score calculations. For example, one or more traffic data storage systems 231, such as traffic databases, may store data corresponding to the amount of traffic and certain traffic characteristics (e.g., amount of traffic, average driving speed, traffic speed distribution, and numbers and types of accidents, etc.) at various specific locations and times. One or more weather data storage systems 232, such as weather databases, may store weather data (e.g., rain, snow, sleet, hail, temperature, wind, road conditions, visibility, etc.) at different locations and different times. One or more additional driving databases/systems 233 may store additional driving data from one or more different data sources or providers which may be relevant to the driving analyses and/or driver score calculations performed by the driving analysis server 220. Additional driving databases/systems 233 may store data regarding events such as road hazards and traffic accidents, downed trees, power outages, road construction zones, school zones, and natural disasters that may affect the driving analyses and/or driver score calculations performed by the driving analysis server 220. As discussed below in reference to FIG. 3, the driving analysis server 220 may retrieve and use data from databases/systems 231-233 to analyze and evaluate the driving behaviors of specific vehicles 210.

Figure 3:
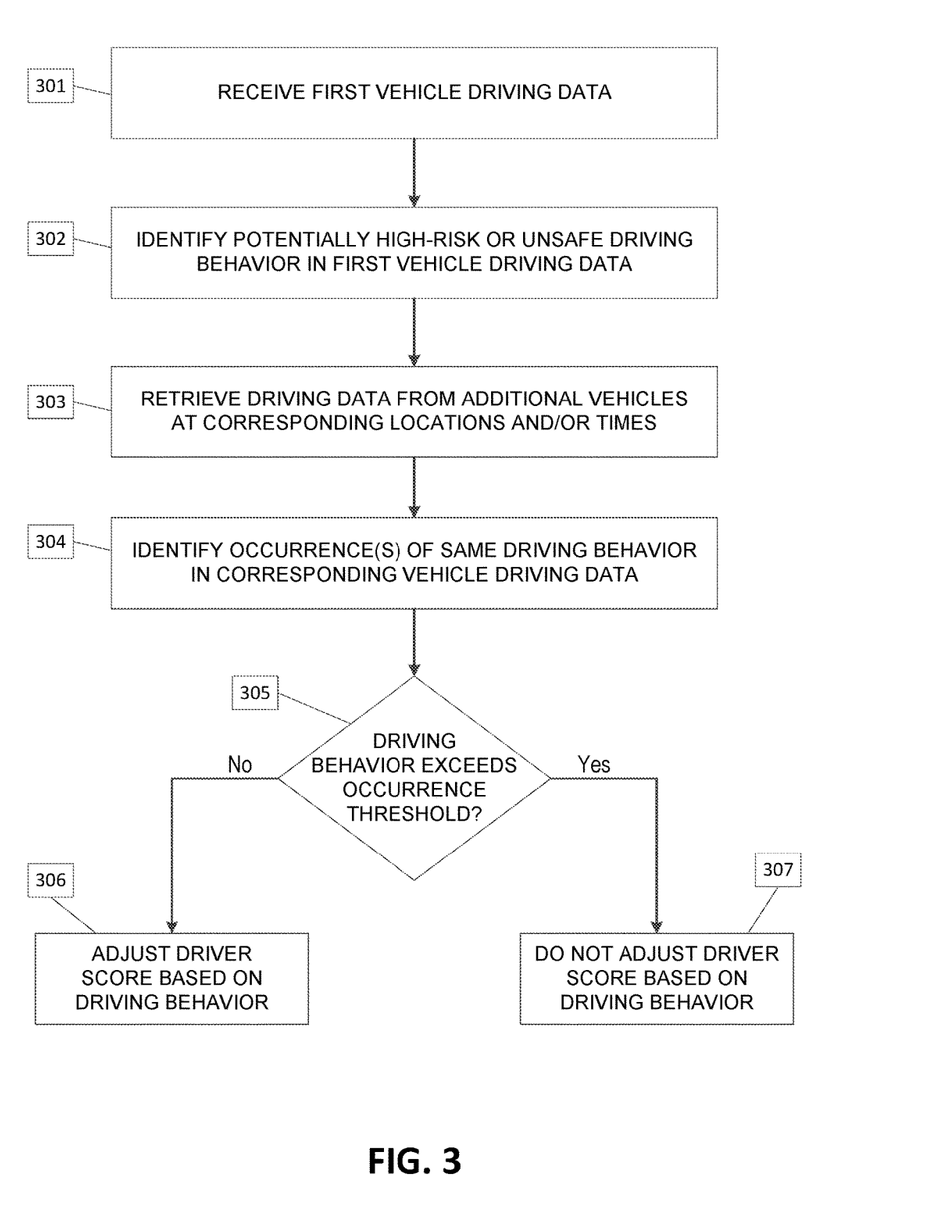
FIG. 3 is a flow diagram illustrating an example method of adjusting a driver score based on the driving behavior of a first vehicle and one or more other vehicles, according to one or more aspects of the disclosure.

FIG. 3 is a flow diagram illustrating an example method of performing a driving analysis based on vehicle driving data. This example method may be performed by one or more computing devices (e.g. driving analysis server 220, vehicle operation computer system 225, and vehicle telematics device 216) in the driving analysis system 200.

The steps in the example method of FIG. 3 describe performing an analysis to determine whether or not to adjust a driver score in response to a potentially high-risk or unsafe driving behavior (e.g., speeding, sudden braking, swerving, tailgating, moving violations, etc.) based on similar driving behavior data from other vehicles. For instance, speeding may be considered a potentially high-risk or unsafe driving behavior, and drivers that speed frequently and excessively may receive lower driver scores than drivers that do not speed. However, in a particular flow of traffic, if most or all of the cars are speeding, then it might be safer for a driver to drive within the flow of traffic than to drive at the speed limit. Similarly, an occurrence of sudden swerving or braking by a vehicle may indicate a high-risk or unsafe driving behavior by a driver not paying attention to the road. However, if many cars on the same road at or near the same time also brake or swerve suddenly, then the swerving or braking by these cars may indicate an unsafe road condition or obstruction (e.g., an icy road, fallen tree, disabled vehicle, etc.), rather than high-risk or unsafe driving by the drivers whose vehicles were braking or swerving.

In step 301, a driving analysis server 220 may receive vehicle operation data (or driving data) for a first vehicle 210. As described above in reference to FIG. 2, the driving analysis server 220 may receive vehicle operation data from one or more vehicle operation computer systems 225 and/or directly from telematics devices 216 or other systems on vehicles 210. The first vehicle driving data may correspond to sensor data collected by sensors 212, proximity or image data collected by sensors and cameras 214, and/or additional data collected by a telematics device 216 or other systems within a vehicle 210. In addition to the vehicle operation data, the driving analysis server 220 may receive location and time information corresponding to the vehicle operation data in step 301. Vehicle location data and time data may be received from the same sources as other vehicle operation data, or may be collected by different data sources or generated by the driving analysis server 220. For example, the driving analysis server 220 may receive vehicle operation data from a vehicle operation system 225, and then may initiate communication with the vehicle's telematics device 216, GPS servers, time servers, or other systems to determine the location and time that correspond to the received vehicle operation data.

In certain embodiments, telematics devices 216, vehicle operation systems 225, and other data sources may transmit vehicle operation data for a first vehicle 210 to the driving analysis server 220 in real-time (or near real-time). The driving analysis server 220 may be configured to receive the vehicle operation data, and then perform real-time (or near real-time) driving analyses and driver score calculations for the first vehicle 210. In other embodiments, vehicle operation data might not be transmitted in real-time but may be sent periodically (e.g., hourly, daily, weekly, etc.) by telematics devices 216 or vehicle operation systems 225. Periodic transmissions of vehicle operation data may include data for a single vehicle or single driver, or for multiple vehicles or drivers. The driving analysis server 220 may be configured to receive the periodic transmissions, and then to perform periodic driving analyses and driver score calculations for one or more vehicles and drivers.

In step 302, the driving analysis server 220 may identify one or more potentially high-risk or unsafe driving behaviors within the operation data of the vehicle 210. The driving behaviors identified in step 302 may correspond to specific occurrences or patterns of high-risk, unsafe, or illegal driving activities that have the potential to affect the driver score of the vehicle 210 or a driver of the vehicle 210.

For certain such driving behaviors, the driving analysis server 220 may identify the driving behavior by analyzing only the vehicle operation data, for example, occurrences of sudden braking, accelerating, swerving, and tailgating. Other driving behaviors that may be identified based only on the vehicle operation data include failure to use seatbelts, phone usage while driving, loud noise levels inside the vehicle while driving (e.g., high stereo volume or passenger noises), or other distractions in the vehicle (e.g., animated passengers or pets in the vehicle, eating while driving, texting while driving, etc.). Additionally, impacts to the body of the vehicle 210 (e.g., minor accidents, driving fast over speed bumps or dips, etc.) may be identified based only on the operation data received for the vehicle 210.

To identify other types of driving behaviors, the driving analysis server 220 may analyze the vehicle operation data, as well as additional data retrieved from one or more external data sources. For example, to identify an occurrence of speeding by the vehicle 210, the driving analysis server 220 may receive vehicle speed data from a telematics device 216 or vehicle operation system 225, and may receive the vehicle's location from the telematics device 216, vehicle operation system 225, or a separate GPS system associated with the vehicle 210. Then, the driving analysis server 220 may access a speed limit database to determine the legal speed limit at the location of the vehicle 210, and may compare the speed limit to the detected speed of the vehicle. The driving analysis server 220 may identify other moving violations using similar techniques. For example, the driving analysis server 220 may identify a failure to use proper turn signals by analyzing the turn signal usage of the vehicle 210, as compared to the location/driving route of the vehicle. Stop sign violations, illegal turns, and U-turn violations may be identified by comparing the driving route of the vehicle 210 to a database of the traffic regulations and posted traffic signs at different streets and intersections along the driving route.

Additional driving behaviors that may be identified in step 302 include occurrences of risky or aggressive driving under adverse driving conditions or in safe driving areas. For example, it may be deemed high-risk or unsafe to drive a vehicle 210 at the maximum speed limit during a rainstorm, snowstorm, or on slick or icy road conditions. To detect an occurrence of this type of driving behavior, the driving analysis server 220 may analyze the speed of the vehicle 210, the speed limit at the vehicle's location, and the weather or road conditions at the time the vehicle was being driven at that location. Additionally, it may be deemed high-risk or unsafe to drive aggressively in safe driving areas, such as construction zones and school zones. To identify an occurrence of aggressive driving in a safe driving area, the driving analysis server 220 may analyze certain vehicle operation data (e.g., sudden acceleration or braking, phone usage while, other driver distractions, etc.), and compare the vehicle's location to a database of safe driving areas.

In step 303, the driving analysis server 220 may retrieve driving data for one or more additional vehicles (e.g., vehicles 210a-n) corresponding to the driving behavior(s) identified for the first vehicle 210 in step 302. As discussed below, the data retrieved in step 303 may allow the driving analysis server 220 to identify occurrences of the same potentially high-risk or unsafe driving behavior in other vehicles at similar times, locations, and/or circumstances. For example, if the driving behavior identified in step 302 is an occurrence of speeding by the first vehicle 210 on Route 1 at 2:00 pm on Saturday, then in step 303 the driving analysis server 220 may retrieve vehicle speed data for a plurality of other vehicles 210a-n that were driven on Route 1 at 2:00 pm on Saturday. Thus, the driving behavior identified for the first vehicle (e.g., speeding) can be compared to the corresponding driving behaviors (e.g., speeding or not speeding) for other vehicles being driven at the same time and location, and under the same circumstances.

In certain embodiments, the driving analysis server 220 may identify a potentially high-risk or unsafe driving behavior of the first vehicle 210 in real-time or near real-time (in step 302), and may retrieve corresponding driving data for other vehicles near the first vehicle at or near the same time (in step 303). After identifying a potentially high-risk or unsafe driving behavior in the first vehicle, one or more of the telematics devices 216 of the first vehicle, the vehicle operation system 225, or the driving analysis server 220 may be used to identify other vehicles 210a-n in the immediate vicinity of the first vehicle 210 at the time of the identified driving behavior. GPS systems or proximity sensors within the vehicle 210 and the vehicles 210a-n, and/or vehicle location data from other sources, also may be used to identify the set of vehicles in the immediate vicinity of the first vehicle 210 at the time of the driving behavior.

In some instances, the driving analysis server 220 may already have, or may already be configured to receive, the corresponding data from the additional nearby vehicles 210a-n. For example, the driving analysis server 220 may receive a stream or batch of vehicle operation data from a vehicle operation system 225 corresponding to all of the vehicles in the same geographic area at the same time. Thus, the driving analysis server 220 may receive the corresponding vehicle operation data for any nearby vehicles 210a-n at the time same that it receives the data for the first vehicle 210 in step 301. In other instances, the driving analysis server 220 may specifically request the information from the vehicle operation system 225 or from vehicle telematics devices 216, for any vehicles determined to be nearby the first vehicle 210 at the time of the identified driving behavior. Thus, the driving analysis server 220 may be configured to locate, initiate communication with, and request specific sensor/camera data from a vehicle operation system 225 or from one or more vehicle telematics devices 216 corresponding to the nearby vehicles 210a-n. For example, if the potentially high-risk or unsafe driving behavior is tailgating by the first vehicle 210, then the driving analysis server 220 may identify other nearby vehicles 210a-n at the time of the identified tailgating, and may specifically request data from the proximity sensors and external cameras 214 of the other vehicles 210a-n that may be used to identify similar occurrences of tailgating by the other vehicles 210a-n.

Depending on the time and location of the potentially high-risk or unsafe driving behavior by the first vehicle 210, the driving analysis server 220 may be unable to locate a significant number of additional nearby vehicles, or may be unable retrieve corresponding driving data from the nearby vehicles. For example, driving behaviors identified in step 302 may take place on remote and isolated roads, or nearby vehicles might not have the necessary sensors 212-214 and telematics devices 216 to detect and transmit the corresponding driving data to the driving analysis server 220. In such cases, the driving analysis server 220 may retrieve corresponding driving data from one or more other data sources. For example, the driving analysis server 220 may request corresponding traffic data from traffic databases 231, including the amount of traffic, average driving speed, lane changes, and instances of accidents at times and locations corresponding to the driving behavior of the first vehicle 210.

When there is insufficient driving data available for other vehicles 210a-n at the time and location corresponding to the driving behavior of the first vehicle 210, the driving analysis server 220 may retrieve similar data for different times and/or different locations that are similar to the time and location of the first vehicle's driving behavior. The specific type of data retrieved by the driving analysis server 220 (e.g., the other vehicles 210a-n identified, the specific sensor data used and other vehicle operation data retrieved, and the times and locations corresponding to the vehicle operation data) may depend on the type of driving behavior identified for the first vehicle 210 in step 302, and other specific circumstances relating to the driving behavior.

For example, if the driving behavior identified for the first vehicle 210 in step 302 is speeding along a particular section of Route 1 at 2:00 am on Monday, then in step 303, the driving analysis server 220 may retrieve corresponding vehicle speed data for any vehicles on the same section of Route 1 between 12:00 am and 4:00 am, Monday through Friday. Depending on the amount of data available, speed data during this time window may be collected over a number of previous weeks or months to provide an adequate sample size. As another example, if the driving behavior identified for the first vehicle 210 in step 302 is failure to stop completely at a stop sign at 2:00 pm on Tuesday afternoon, then in step 303, the driving analysis server 220 may retrieve corresponding vehicle data (e.g., driving speed and braking data) for any vehicles at the same intersection at any time in the previous several months. As another example, if the driving behavior identified for the first vehicle 210 in step 302 is a sudden swerve at a certain point on Main Street at 4:30 pm on Wednesday, then in step 303, the driving analysis server 220 may retrieve corresponding vehicle data (e.g., steering/swerving data) only for vehicles on the same section of Main Street, and only between 3:30 pm and 5:30 pm on the same Wednesday afternoon. The sudden swerve in this example may be due to an accident, disabled vehicle, or temporary road obstruction, and therefore data might not be collected for previous weeks and months because such data might not accurately reflect the similar circumstances to the driving behavior identified for the first vehicle 210. As yet another example, if the driving behavior identified for the first vehicle 210 in step 302 is driving aggressively during a rain or snow storm on Thursday morning, then in step 303, the driving analysis server 220 may retrieve corresponding vehicle data (e.g., speed, acceleration and braking rates, steering/swerving data) for vehicles within the same general area as the rain or storm at any time during the storm.

In step 304, the driving analysis server 220 may use the additional vehicle driving data retrieved in step 303 to identify occurrences of the same or similar driving behaviors as the first vehicle driving behavior that was identified in step 302. The driving analysis server 220 may perform the analysis in step 304 separately for each other vehicle and for each driving behavior. That is, for each additional vehicle that vehicle driving data was retrieved in step 303, the driving analysis server 220 may analyze the driving data for that vehicle to determine if one or more instances occur for the same (or a similar) driving behavior. For example, if the driving behavior identified for the first vehicle 210 in step 302 is speeding by greater than 20 miles-per-hour (MPH) along a particular section of Main Street, then in step 304, the driving analysis server 220 may analyze each trip by each other vehicle down the same section of Main Street to identify other occurrences of speeding greater than 20 MPH. If the data retrieved in step 303 includes vehicle driving data for 500 vehicle trips down the same section of Main Street, then the driving analysis server 220 may analyze the vehicle's speed data on each trip and classify each of the 500 trips as either an occurrence of speeding greater than 20 MPH or an occurrence of not speeding greater than 20 MPH.

When identifying occurrences of the same or similar driving behaviors, between the first vehicle 210 and the additional vehicles 210a-210n, the driving analysis server 220 may compare the specific vehicle operational data (e.g., vehicle speeds, rates of accelerating and braking, severity of swerving, tailgating distances, number and severity of lane departures, etc.) between the vehicles. In certain instances, thresholds may be defined for each driving behavior (e.g., speeding, sudden acceleration and braking, swerving, tailgating, other moving violations, etc.) so that occurrences and non-occurrences of the driving behavior can be identified within the data retrieved in step 303. The thresholds may depend on the general type of driving behavior as well as specific situational factors. For example, an occurrence of speeding for one analysis in step 304 may be defined 10 miles-per-hour (MPH) over the posted speed limit, whereas in a different analysis in step 304 (e.g., on a different road, with different road conditions, and at a different time of day) may define speed as 5 MPH over the posted limit. The thresholds for occurrences of sudden accelerating, braking, and swerving, and failing to use turn signals (or other vehicle controls), may be based on the readings of the vehicle's operational sensors 212. The thresholds for occurrences of tailgating may be based on the vehicle's proximity sensors and cameras 214. For other potentially high-risk or unsafe driving behaviors, the appropriate sensor data or other data sources may be used to set and use thresholds for measuring occurrences and non-occurrences of the behavior by other vehicles 210a-n.

The data retrieved in step 303 and analyzed in step 304 may correspond to the same location and time as the identified driving behavior of the first vehicle 210 (e.g., Main Street at 1st Avenue, 1:00 pm on Monday), or may correspond to different locations (e.g., Broad Street at 1st Avenue, 1:00 pm on Monday) and/or different times (Main Street at 1st Avenue, 1:00 pm on Tuesday). For each of these examples, the driving analysis server 220 may identify occurrence or a non-occurrence of the same driving behavior identified in step 302. However, the thresholds for identifying an occurrence or a non-occurrence may be adjusted when the analyzed data corresponds to different times and/or locations. For example, if the first vehicle 210 was speeding down a quiet isolated road at night, and the data analyzed in step 304 includes vehicle speed data for the same road during both daytime at nighttime, then the driving analysis server 220 may set a higher MPH threshold for identifying an occurrence of speeding during the daytime because of the increased daytime visibility.

In step 305, the driving analysis server 220 determines if the number (or percentage) of occurrences of the driving behavior identified in step 304 exceeds a threshold number (or threshold percentage) of occurrences. If the number/percentage does not exceed the threshold number/percentage (305:No), this indicates a relatively small number of occurrences of the potentially high-risk or unsafe driving behavior among the data retrieved in step 303. In this case, the potentially high-risk or unsafe driving behavior identified for the first vehicle 210 in step 302 is a relatively uncommon driving behavior. Accordingly, in step 306, the driving analysis server 220 may adjust (e.g., lower) a driver score associated with the first vehicle or a driver of the first vehicle, based on the potentially high-risk or unsafe driving behavior identified in step 302. On the other hand, if the number/percentage exceeds the threshold number/percentage (305:Yes), this indicates a relatively large number of occurrences of the potentially high-risk or unsafe driving behavior among the data retrieved in step 303. In this case, the driving behavior identified for the first vehicle 210 in step 302 is a relatively common driving behavior, and may be less likely to be a high-risk or unsafe driving behavior. Accordingly, in step 307, the driving analysis server 220 might not adjust the driver score associated with the first vehicle or driver of the first vehicle, based on the driving behavior identified in step 302.

As an example, if the potentially high-risk or unsafe driving behavior identified for the first vehicle 210 in step 302 is speeding by greater than 10 MPH, then in step 305, the driving analysis server 220 may compare the percentage of other vehicles that were also speeding by greater than 10 MPH against a percentage threshold (e.g., 50%). In this example, if 90% of the other vehicles (for which data was retrieved in step 303) were also speeding by greater than 10 MPH, then the driver score associated with the first vehicle 210 will not be adjusted (after comparing the 90% occurrence rate to the 50% threshold) because the driving analysis server 220 may conclude that the same driving behavior is common among other vehicles. On the other hand, if only 5% of the other vehicles were speeding by greater than 10 MPH, than the driver score will be adjusted (after comparing the 5% occurrence rate to the 50% threshold), because the driving analysis server 220 may conclude that the first vehicle 210 was speeding excessively in comparison with other vehicles. Similar analysis and threshold comparisons may be performed for other types of potentially high-risk or unsafe driving behavior, such as sudden acceleration or braking, swerving, tailgating, lane departures, failure to use turn signals or other vehicle controls, or other moving violations. In these examples, if a relatively high percentage of other vehicles have the same driving behavior, the behavior may be deemed less risky or unsafe and the driver score associated with the first vehicle 210 might not be lowered, or it may be lowered by less than it otherwise would be. If a relatively low percentage of other vehicles have the same driving behavior, the behavior may be deemed more risky or unsafe and the driver score associated with the first vehicle 210 may be lowered, or it may be lowered by more than it otherwise would be.

In certain examples, the driving analysis server 220, vehicle operation computer system 225, and/or the telematics device 216 may be configured to send data to one or more output devices that may be visible to the driver or other users. For example, the telematics device 216 or vehicle operation computer system 225 may send vehicle operation data and any identified occurrences of potentially high-risk or unsafe driving behavior to a separate computing device (e.g., personal computer, e-mail account, mobile device) associated with the drivers or the owners of the vehicle 210. Additionally, the driving analysis server 220 may be configured to notify vehicle drivers or owners of any adjustments made to the driver's/vehicle's driver score in step 306. Any occurrences of identified driving behaviors that may affect the driver score and/or any adjustments to the driver score also may be displayed within the vehicle 210. For example, driving analysis server 220, vehicle operation computer system 225, and/or the telematics device 216 may be configured to project a warning of a potentially high-risk or unsafe driving behavior, or an updated driver score, on the display console, windshield, or rear view mirror of the vehicle 210.

As discussed above in step 304, the driving analysis server 220 may analyze the corresponding vehicle driving data in step 304 and may classify each vehicle and driving behavior as either an occurrence or a non-occurrence of the first vehicle driving behavior identified in step 302. However, in other examples, the driving analysis server 220 need not classify each vehicle/driving behavior as an occurrence or a non-occurrence, but instead may perform a statistical analysis on the complete set of corresponding vehicle driving data. In such examples, driving analysis server 220 may determine a statistical distribution (or statistical function) representing the driving behavior, and then may place the first vehicle driving behavior within the statistical distribution or function. For instance, after determining a statistical distribution for the driving behavior, the driving analysis server 220 may determine that the identified behavior of the first vehicle 210 corresponds to the Nth percentile among the corresponding vehicle driving data retrieved in step 303. In these examples, the threshold in step 305 may correspond to a percentile threshold (e.g., 30th percentile 50th percentile, 75th percentile, 98th percentile, etc.) for the driving behavior of the first vehicle 210. If the magnitude or severity of the potentially high-risk or unsafe driving behavior is greater than the percentile threshold, than the driver score for the vehicle/driver may be adjusted (step 306), and if the magnitude or severity of the driving behavior is not greater than the percentile threshold, than the driver score for the vehicle/driver may not be adjusted (step 307).

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. A driving analysis system comprising a first vehicle on-board data recording system and a driving analysis server:
  wherein the first vehicle on-board data recording system comprises:
    one or more vehicle operation sensors or cameras configured to record vehicle operation data at the first vehicle; and
    one or more telematics devices configured to transmit the vehicle operation data from the first vehicle to the driving analysis server,
  wherein the driving analysis server comprises a processor and a memory unit storing computer-executable instructions, which when executed by the processor, cause the driving analysis server to:
    receive first vehicle driving data from the first vehicle on-board data recording system, the first vehicle driving data associated with a first vehicle location;
    identify an occurrence of a driving behavior in the first vehicle driving data;
    receive other vehicle driving data from one or more driving data sources, the other vehicle driving data corresponding to one or more other vehicles driven at or near the first vehicle location;
    analyze the received other vehicle driving data to identify occurrences of the driving behavior in the other vehicle driving data;
    responsive to identifying occurrences of the driving behavior in the other vehicle driving data, maintaining a driver score of a driver of the first vehicle; and
    responsive to not identifying occurrences of the driving behavior in the other vehicle driving data, adjusting the driver score of the driver of the first vehicle.

2. The driving analysis system of claim 1, wherein the first vehicle location is determined based on Global Positioning System (GPS) data.

3. The driving analysis system of claim 1, wherein the first vehicle driving data and the other vehicle driving data are from a same time period.

4. The driving analysis system of claim 1, wherein the first vehicle on-board data recording system comprises sensors or cameras configured to record at least one of: vehicle acceleration rates, vehicle braking rates, vehicle speed, vehicle steering, an impact to the vehicle, vehicle following distance, or vehicle lane position.

5. The driving analysis system of claim 4, wherein the identified occurrence of the driving behavior includes at least one of: an occurrence of sudden acceleration, an occurrence of sudden braking, an occurrence of speeding, an occurrence of swerving, an occurrence of an impact to the vehicle, an occurrence of tailgating, an occurrence of a lane departure, or an occurrence of a moving violation.

6. The driving analysis system of claim 1, wherein the first vehicle on-board data recording system is configured to record and transmit at least one of: vehicle speed data, vehicle acceleration data, vehicle braking data, vehicle steering data, use of vehicle turn signals, use of vehicle seat belts, use of a radio in the vehicle, or use of a phone in the vehicle.

7. The driving analysis system of claim 1, wherein the first vehicle on-board data recording system is configured to record and transmit at least one of: image data, video data, or object proximity data collected by at least one camera or proximity sensor in the first vehicle on-board data recording system.

8. The driving analysis system of claim 1, wherein receiving the other vehicle driving data comprises:
  determining the first vehicle location of the first vehicle;
  identifying the one or more other vehicles based on a determination that each of the one or more other vehicles are at or near the first vehicle location; and
  retrieving the other vehicle driving data collected by vehicle on-board data recording systems within the one or more other vehicles.

9. The driving analysis system of claim 1, wherein receiving the other vehicle driving data comprises:
  determining the first vehicle location of the first vehicle; and
  retrieving other vehicle driving data from a traffic database for vehicles that were driven at or near the first vehicle location.

10. A driving analysis system comprising a first vehicle on-board data recording system, a second vehicle on-board data recording system, and a driving analysis server:
  wherein the first vehicle on-board data recording system comprises:
    one or more vehicle operation sensors or cameras configured to record vehicle operation data at the first vehicle; and
    one or more telematics devices configured to transmit the vehicle operation data from the first vehicle to the driving analysis server;
  wherein the second vehicle on-board data recording system comprises:
    one or more vehicle operation sensors or cameras configured to record vehicle operation data at the second vehicle; and
    one or more telematics devices configured to transmit the vehicle operation data from the second vehicle to the driving analysis server;
  wherein the driving analysis server comprises a processor and a memory unit storing computer-executable instructions, which when executed by the processor, cause the driving analysis server to:
    receive first vehicle driving data from the first vehicle on-board data recording system, the first vehicle driving data associated with a first vehicle location;
    identify an occurrence of a driving behavior in the first vehicle driving data;
    receive second vehicle driving data from the second vehicle on-board data recording system, the second vehicle driving data associated with a second vehicle location at or near the first vehicle location;
    analyze the received second vehicle driving data to identify an occurrence of the driving behavior in the second vehicle driving data;
    responsive to identifying an occurrence of the driving behavior in the second vehicle driving data, maintaining a driver score of a driver of the first vehicle; and
    responsive to not identifying an occurrence of the driving behavior in the second vehicle driving data, adjusting the driver score of the driver of the first vehicle.

11. The driving analysis system of claim 10, wherein the first vehicle location is based on Global Positioning System (GPS) data.

12. The driving analysis system of claim 10, wherein the first vehicle driving data and the second vehicle driving data are from a same time period.

13. The driving analysis system of claim 10, wherein the first vehicle on-board data recording system and the second vehicle on-board data recording system each comprise sensors or cameras configured to record at least one of: vehicle acceleration rates, vehicle braking rates, vehicle speed, vehicle steering, an impact to the vehicle, vehicle following distance, or vehicle lane position.

14. The driving analysis system of claim 13, wherein the identified occurrence of the driving behavior includes at least one of: an occurrence of sudden acceleration, an occurrence of sudden braking, an occurrence of speeding, an occurrence of swerving, an occurrence of an impact to the vehicle, an occurrence of tailgating, an occurrence of a lane departure, or an occurrence of a moving violation.

15. The driving analysis system of claim 10, wherein the first vehicle on-board data recording system and the second vehicle on-board data recording system are each configured to record and transmit at least one of: vehicle speed data, vehicle acceleration data, vehicle braking data, vehicle steering data, use of vehicle turn signals, use of vehicle seat belts, use of a radio in the vehicle, or use of a phone in the vehicle.

16. The driving analysis system of claim 10, wherein the first vehicle on-board data recording system and the second vehicle on-board data recording system are each configured to record and transmit at least one of: image data, video data, or object proximity data collected by at least one camera or proximity sensor in the first vehicle on-board data recording system.

17. The driving analysis system of claim 10, the driving analysis server storing additional computer-executable instructions, which when executed by the processor, cause the driving analysis server to:
determine the first vehicle location of the first vehicle; and
identify the second vehicle based on a determination that the second vehicle is at or near the first vehicle location.

18. The driving analysis system of claim 17, the driving analysis server storing additional computer-executable instructions, which when executed by the processor, cause the driving analysis server to:
request vehicle driving data from the second vehicle on-board data recording system based on the determination that the second vehicle is at or near the first vehicle location, wherein the vehicle driving data requested from the second vehicle on-board data recording system corresponds to the first vehicle driving data received from the first vehicle on-board data recording system.

19. A driving analysis system comprising: a first vehicle on-board data recording system, one or more other vehicle on-board data recording systems, one or more vehicle operation computer systems, one or more traffic data storage systems, and a driving analysis server,
wherein the first vehicle on-board data recording system comprises:
one or more vehicle operation sensors or cameras configured to record vehicle operation data at the first vehicle; and
one or more telematics devices configured to transmit the vehicle operation data from the first vehicle to a first vehicle operation computer system of the one or more vehicle operation computer systems,
wherein each of the one or more other vehicle on-board data recording systems comprises:
one or more vehicle operation sensors or cameras configured to record vehicle operation data at at least one other vehicle; and
one or more telematics devices configured to transmit the vehicle operation data from the at least one other vehicle to a second vehicle operation computer system of the one or more vehicle operation computer systems,
wherein each of the one or more vehicle operation computer systems comprises a processor and a memory unit storing computer-executable instructions, which when executed by the processor, cause the vehicle operation computer system to:
receive and store vehicle operation data from the one or more telematics devices of the first vehicle on-board data recording system or the other vehicle on-board data recording systems; and
transmit the vehicle operation data to the driving analysis server,
wherein each of the one or more traffic data storage systems comprises a processor and a memory unit storing computer-executable instructions, which when executed by the processor, cause the traffic data storage system to:
receive and store traffic data regarding a plurality of driving behaviors, a plurality of geographic locations associated with said driving behaviors, and a plurality of time periods associated with said driving behaviors; and
transmit the traffic data regarding a plurality of driving behaviors to the driving analysis server,
wherein the driving analysis server comprises a processor and a memory unit storing computer-executable instructions, which when executed by the processor, cause the driving analysis server to:
receive first vehicle driving data from one or more of the vehicle operation computer systems, the first vehicle driving data associated with a first vehicle location;
identify an occurrence of a driving behavior in the first vehicle driving data;
receive other vehicle driving data from at least one of the vehicle operation computer systems or the traffic data storage systems, the other vehicle driving data associated with one or more other vehicle locations at or near the first vehicle location;
analyze the received other vehicle driving data to identify occurrences of the driving behavior in the other vehicle driving data;
responsive to identifying occurrences of the driving behavior in the other vehicle driving data, maintaining a driver score of a driver of the first vehicle; and
responsive to not identifying occurrences of the driving behavior in the other vehicle driving data, adjusting the driver score of the driver of the first vehicle.

20. The driving analysis system of claim 19, wherein the first vehicle location is based on Global Positioning System (GPS) data.

* * * * *